United States Patent
Krauss

(10) Patent No.: US 8,215,620 B2
(45) Date of Patent: Jul. 10, 2012

(54) SELF-PUMPING RIDE LEVEL CONTROL SYSTEM

(75) Inventor: Hans-Peter Krauss, Garbsen-Frielingen (DE)

(73) Assignee: Continental AG, Hanover (DE)

( * ) Notice: Subject to any disclaimer, the term of this patent is extended or adjusted under 35 U.S.C. 154(b) by 580 days.

(21) Appl. No.: 12/516,285

(22) PCT Filed: Oct. 16, 2007

(86) PCT No.: PCT/EP2007/060996
§ 371 (c)(1),
(2), (4) Date: May 26, 2009

(87) PCT Pub. No.: WO2008/061849
PCT Pub. Date: May 29, 2008

(65) Prior Publication Data
US 2010/0065994 A1    Mar. 18, 2010

(30) Foreign Application Priority Data
Nov. 25, 2006  (DE) .......................... 10 2006 055 757

(51) Int. Cl.
*B60G 17/00* (2006.01)
(52) U.S. Cl. .................. 267/64.17; 267/64.28; 267/218; 188/282.3; 188/312
(58) Field of Classification Search ............... 267/64.17, 267/64.15, 64.16, 64.18, 64.21, 64.24, 64.26, 267/64.28, 218; 188/282.1, 282.3, 282.8, 188/312, 313, 320, 322.15, 322.21
See application file for complete search history.

(56) References Cited

U.S. PATENT DOCUMENTS

| | | | | |
|---|---|---|---|---|
| 4,577,840 A | * | 3/1986 | Meller et al. | 267/64.17 |
| 4,578,950 A | | 4/1986 | Ruben | |
| 4,635,765 A | * | 1/1987 | Schmidt | 188/266.3 |
| 5,464,079 A | * | 11/1995 | Lohberg et al. | 188/315 |
| 5,467,852 A | * | 11/1995 | de Kock | 188/282.2 |
| 5,564,680 A | * | 10/1996 | Sano et al. | 267/64.17 |
| 5,647,580 A | * | 7/1997 | Buma | 267/64.17 |
| 5,797,594 A | * | 8/1998 | Sekine et al. | 267/64.17 |
| 6,202,993 B1 | * | 3/2001 | Wilms et al. | 267/136 |
| 6,817,597 B1 | * | 11/2004 | Thurow et al. | 267/122 |

FOREIGN PATENT DOCUMENTS

| | | |
|---|---|---|
| DE | 350851 | 7/1986 |
| DE | 19629501 | 1/1997 |
| DE | 19529389 | 2/1997 |
| EP | 0033839 | 8/1981 |
| EP | 1249357 | 10/2002 |
| WO | WO2005/108818 | 11/2005 |

\* cited by examiner

Primary Examiner — Pamela Rodriguez
(74) Attorney, Agent, or Firm — Brinks Hofer Gilson & Lione

(57) ABSTRACT

Self-pumping spring and damper unit (13) with automatically activated ride level control system for chassis of vehicles having a pump which is driven as a result of the distance between the articulation points (14, 15) which changes as a result of the spring compression and spring extension of the vehicle, wherein an elastic connecting element (35) is arranged between at least one pump part (33) and the associated articulation point (14) in such a way that it at least partially elastically compensates the distance between the pump parts (32, 33) which changes when the vehicle experiences spring compression and spring extension.

15 Claims, 6 Drawing Sheets

SELF-PUMPING RIDE LEVEL CONTROL SYSTEM

BACKGROUND OF THE INVENTION

The invention relates to a self-pumping spring and damper unit with automatic ride level control for chassis of vehicles, in particular for motor vehicles or motorcycles, which is articulated at one articulation point on the body and at the other articulation point on the chassis and the damping unit of which has at least two working spaces which are connectable by means of a throughflow throttle valve and which contain a damping and/or springing medium which, during the jounce and rebound of the vehicle, is exchanged, damped by the throttle valves, between the working spaces, the spring and damper unit having at least one pump which is driven by means of the distance between the articulation points which varies as a result of the jounce and rebound of the vehicle, said pump generating a pressure rise in the damping and/or springing medium, with the result that the spring and damper unit maintains a fixed level in the event of a variable load on the vehicle, the pump consisting essentially of two pump parts which are movable in relation to one another and reduce a compression space and of which one pump part is connected to one articulation point and the other pump part to the other articulation point such that the distance between the articulation points which varies during the jounce and rebound of the vehicle is transferred as a compression stroke to the distance of the pump parts from one another.

Such self-pumping ride level control systems are known in connection with hydraulic dampers, in particular also in pneumatic suspensions with hydraulic dampers.

DE AS 1 209 891 discloses, in this respect, a hydropneumatic spring suspension for vehicles which connects a ride level control system for a pneumatic spring to a hydraulic shock absorber device. In this case, the hydraulic fluid serves for transmitting the forces to be absorbed to the gas cushion. The hydraulic fluid can be pumped to and fro between a reservoir and the fluid space of the springing part with the aid of a piston/cylinder arrangement, the pumping movement being generated as a result of the jounce, that is to say the springing movements, of the vehicle. The pump chamber provided in this case is an annular space between a cylinder inner wall and a piston rod, which space is connected to a reservoir and to the fluid space via inlet and outlet valves.

DE 195 47 536 A1 discloses a self-pumping hydropneumatic spring strut with internal ride level control, in which, as a result of the springing movement of the vehicle, damping medium is conveyed from a low-pressure chamber into a high-pressure chamber separated from the latter by a piston, and the two chambers are provided with pressure-accumulating gas cushions. Here, too, the pumping movement is generated by a pumping rod which penetrates into a cavity of the piston rod and which, by being tied up to the remaining damper components, transmits the springing movement of the vehicle. Here, too, oil is pumped in order to displace the ride level position. The enclosed gas volume is not changed—it has merely been compressed beforehand as a result of the increase in load.

These hydraulic dampers, in the past used almost exclusively for passenger cars with pneumatic spring systems/hydropneumatic spring systems, have recently been replaced increasingly by pneumatic spring and damper units, in which both springing and damping take place by means of a gaseous medium. Such pneumatic spring and damper units serve as particularly convenient spring suspension elements in vehicles and give a pleasant ride sensation in a spring suspension which can be adapted between a "soft" and "hard" suspension behavior, depending on road conditions.

However, whereas the previous solutions with hydraulic dampers could also be designed as simple self-pumping hydropneumatic spring struts with internal ride level control, as shown in the prior art, this was not previously the case with regard to straightforward pneumatic spring and damper devices. In the latter, as a rule, ride level control is carried out by means of a separate ride level control system which, in addition to the actual pneumatic spring and damper devices, that is to say the spring elements on the vehicle wheels, has a multiplicity of sometimes electrically operated accessories, such as pumps, accumulators, valves, etc., which all have to be accommodated in the vehicle. Furthermore, the previous simple solutions of self-pumping hydropneumatic spring struts with hydraulic dampers cannot be used for pneumatic dampers because of the compressibility of the gas.

The object of the invention, therefore, was to provide a simple self-pumping spring and/or damper unit with automatic ride level control, which can be used both as a ride level-controlled pneumatic spring for hydropneumatic spring struts and for pneumatic spring and damper devices, hence in which both the spring devices and damper devices operate with a compressible medium, said spring and/or damper unit having a compact type of construction which operates essentially without the additional assemblies of a ride level control system and which can therefore also be used easily for smaller vehicles and two wheelers.

SUMMARY OF THE INVENTION

In the spring and damper unit according to the invention with automatic ride level control, an elastic connection element is arranged between at least one pump part, serving for the pressure rise in the damping and/or springing medium, and the associated articulation point, such that said connection element at least partially compensates elastically the distance between the pump parts which varies during the jounce and rebound of the vehicle, that is to say the compression stroke.

Such an elastic connection element, which at least partially absorbs or compensates resiliently or elastically the overall stroke between the articulation points which acts on the pump parts in a design such as this, makes it possible for the first time to have a pumping of compressible damping and/or springing medium and also the pressure rise of the latter. In this case, it is unimportant whether the overall stroke is transferred in its action to the pump part or acts directly on the latter. This basic difference in the pumping of a compressible medium within a damper, with a compression stroke predetermined by the vehicle movement, as compared with a pumping of an incompressible medium under the same circumstances within a damper or a spring, becomes clear from the following consideration:

The pressure of an essentially incompressible medium, such as hydraulic oil, rises to a random height even when there is a minimal reduction in a predetermined outlet volume. As a result, in self-pumping hydropneumatic spring struts, known in the prior art, with hydraulic dampers and with a rigid transfer of the vehicle movement/rigid transfer of the stroke between the articulation points, even a slight swing about the zero position, that is to say a slight vertical movement of the vehicle of, for example +/−10 mm, is sufficient, with the aid of a piston/cylinder arrangement, to put hydraulic fluid under high pressure during each minimal swing and thereby pump it around.

The zero position, on which a "pumping or regulating situation" is based in such self-pumping systems with automatic ride level control, is, of course, the initial theoretical rest position when a vehicle is at a standstill, which occurs after considerable load. The springs are therefore loaded and, together with the dampers, are compressed, the body drops, and the vehicle "kneels". In order, then, to carry out ride level control, that is to say to bring the body again to the height or the distance from the chassis which it assumes without a load, the vehicle has to be driven. As a result of the jounce and rebound of the vehicle occurring during driving, the pump can then be driven, which generates the pressure rise in the damping and/or springing medium and raises the body again.

With compressible media, such as air, however, the already mentioned swing about the zero position, customary in medium-hard springings and dampings in chassis, as a compression stroke is nowhere near adequate to generate a sufficiently high pressure in the gaseous medium which would allow pumping around or an opening of the valves to a high-pressure space and, consequently, raise the body again. In order to achieve here a sufficient compression stroke between two pump parts movable in relation to one another and reducing a compression space, it is therefore necessary, after considerable load, to have a high jounce or rebound, that is to say a large stroke between the articulation points of a spring and damper unit.

Such high jounce out of the zero position already mentioned above is certainly readily possible for a pneumatic spring which would still be relatively "soft" even after load, but this usually takes place only with an increasing travel distance and not immediately at the start of the vehicle. The body of a vehicle having a self-pumping system designed as a pneumatic spring and damper unit and with automatic ride level control therefore cannot be raised again by a minimal swing about the zero position as early as after the first meters traveled, as is the case in hydraulic systems, but, instead, would require a usually longer travel distance in which high jounce or rebound also occurs and in which the pneumatic spring and damper unit could even only once "block" in its vertical movement, so that a cut-in of the stop buffer takes place.

However, since the rigid transfer, known hitherto in hydraulic systems, of the change in distance between the articulation points to the pump for the pressure rise (raising of the body) could lead to the destruction of the pump unit in a pneumatic spring and damper unit on account of the high jounce required there, this is where the solution according to the invention comes in. This provides for the distance between the pump parts which varies during the jounce and rebound of the vehicle to be at least partially compensated elastically. Consequently, in cooperation with an appropriate dimensioning of the individual parts, for example, the distance or stroke, varying during jounce and transferred to the pump parts, between the articulation points, that is to say the length of the jounce travel or compression stroke, is utilized only until a sufficiently high pressure in the compressible medium is reached which causes pumping around or an opening of the valves to a high-pressure space and the raising of the body. Further jounce or even bottoming up to the cut-in of the stop buffers is then no longer transferred to the pump parts, but is absorbed elastically or resiliently. The pump parts are consequently separated from the jounce travels, not from the jounce forces, by the body and can operate, free of faults, independently of the jounce height, without being damaged.

Such a design can therefore be used both for pneumatic spring and damper units which are designed as self-pumping systems with automatic ride level control and for those self-pumping systems which consist of a pneumatic spring and of a hydraulically operating damper.

In an advantageous development, the pump is designed as a piston pump, with a pumping piston which is connected to the upper articulation point and which is movable in a pumping cylinder connected to the lower articulation point, so that the pressure rise takes place while the spring and damper unit is in the pressure stage, hence during the jounce of the vehicle, that is to say during the reduction in the distance between the articulation points. This results in a simple design of the pump and in high efficiency.

In a further advantageous development, the two working spaces are separated by a damper piston displaceable in a damper cylinder, the damper cylinder being connected to one articulation point and the damper piston being connected via a hollow piston rod to the other articulation point, and the piston pump being designed within the hollow piston rod such that the hollow piston rod serves as a pumping cylinder, in which is arranged a pumping piston designed concentrically with respect to the piston rod and driven via a tappet connected to the damper cylinder. By virtue of such a concentric and space-saving arrangement of the essential components, the overall size can be reduced and can be adapted to predetermined "packaging" in the vehicle.

In a further advantageous development, the spring and damper unit is designed as a pneumatic spring and damper unit operating with compressed air, at least one of the working spaces filled with compressed air being delimited at least partially by movable walls in the form of a rolling bellows, and the rolling bellows rolling at least partially on the contours of rotationally symmetrical bodies. By means of such a design, the advantages of comfortable and adjustable springing and damping by means of gaseous media can be combined with those of self-pumping automatic ride level control within a spring and damper device. Such a combination has hitherto been achieved in the prior art only by the assemblage of a multiplicity of separate and sometimes electrically operated accessories, such as pumps, accumulators, valves, etc.

In a further advantageous development, the spring and damper unit has at least one let-down device which is driven and/or controlled by the distance between the articulation points which varies as a result of the jounce and rebound of the vehicle, said let-down device generating a pressure lowering in the damping and/or springing medium, with the result that the spring and damper unit maintains a fixed level in the event of a variable load on the vehicle. By means of such a let-down device, the lowering or let-down of the body can be initiated in a simple way and as a function of the "height position" of the body.

Of course, the let-down device may also be designed as a separate valve or pump structure and be driven externally, that is to say outside the spring and damper unit, for example, via a solenoid valve and be controlled via a level sensor.

In a further advantageous development, the distance between the pump parts which varies during the jounce and rebound of the vehicle, that is to say the compression stroke, and the length of displacement between the let-down piston and let-down cylinder are adjustable. As a result, the spring and damper unit can be set to changed basic loads and to expected loads for different vehicles in each case. Of course, the required setting elements or the actuating elements for this setting may also be routed outward, so that they can be adjusted or actuated on the outside or in any event outside the spring and damper unit. By means of such a design, for example, spring and damper units of a two-wheeler can be preset to the expected load, that is to say, for example, to the driving states "single driver", with "luggage" or with "luggage and passenger".

In a further advantageous development, the dimensions of the helical spring arranged between the tappet and piston and/or the dimensions of the helical spring on the let-down cylinder designed as a sleeve and also the dimensions of the stops and receptacles for these springs are designed such that the latter are used as additional spring elements for increasing the progression of the spring and damper unit. As a result, the spring and damper unit, overall, can be produced in a highly compact way and can easily be adapted in structural terms in its springing properties even for smaller vehicles.

In a further advantageous development, the spring and damper unit has a two-stage pump which is driven by the distance between the articulation points which varies as a result of the jounce and rebound of the vehicle, said pump generating a pressure rise in the damping and/or springing medium, the two-stage pump being designed such that the second pump stage is driven only when the pumping piston travel or the compression stroke of the first stage of the pump is already fully utilized and therefore the first stage is already "at a stop". Consequently, the body of a vehicle having a self-pumping pneumatic spring and damper unit operating by means of compressed air and with automatic ride level control can be raised easily and after a relatively short travel distance even in the rare cases where either the load is too high and the first stage is already "at a stop" simply due to the additional weight, or even when, after a long standstill time of the vehicle, a drop below the standard height has already taken place, for example due to leakage losses.

In a particular use of a single-stage or multi-stage pump, articulated between two articulation points on the body and chassis of a vehicle, of the self-pumping spring and damper unit according to the invention, the pump is used not only within a spring strut or within only a self-pumping spring and damper unit, but as a separate pressure generator at any desired location for automatic pressure generation, driven by the jounce and rebound of the vehicle, within a pressure supply system for ride level control. As a result, within such a, for example, otherwise conventional ride level control system, the electrically operated compressor can be replaced or at least assisted.

In this advantageous use, therefore, "pump technology" is adopted, but in this case configured and designed as a straightforward chassis pump which can serve as a supply unit for a vehicle with pneumatic spring suspension and does not need any electronics. This pump may, of course, also be installed, in conjunction with a pneumatic spring and a hydraulic damper, in the construction space of the hydraulic damper. If a hydraulic damper together with a pneumatic spring is used, the chassis pump can be mounted at any desired location between the axle and vehicle body, that is to say, for example, articulated parallel to the damper, parallel to the spring or even lying below the vehicle floor via levers. A combination of a pneumatic spring with an integrated chassis pump in conjunction with a hydraulic damper is also possible.

It therefore becomes clear that the solution according to the invention can be used for pneumatic springs, for pneumatic springs with oil dampers, for pneumatic dampers, for combinations of pneumatic springs and pneumatic dampers (pneumatic spring/damper units), for separate chassis pumps and for combinations of all these spring and damper devices with one another, that is to say wherever gas as a compressible medium is used as a springing or damping medium.

The further advantageous refinements are explained in more detail by means of an exemplary embodiment of the present invention.

DETAILED DESCRIPTION OF THE DRAWINGS

Figure 1:
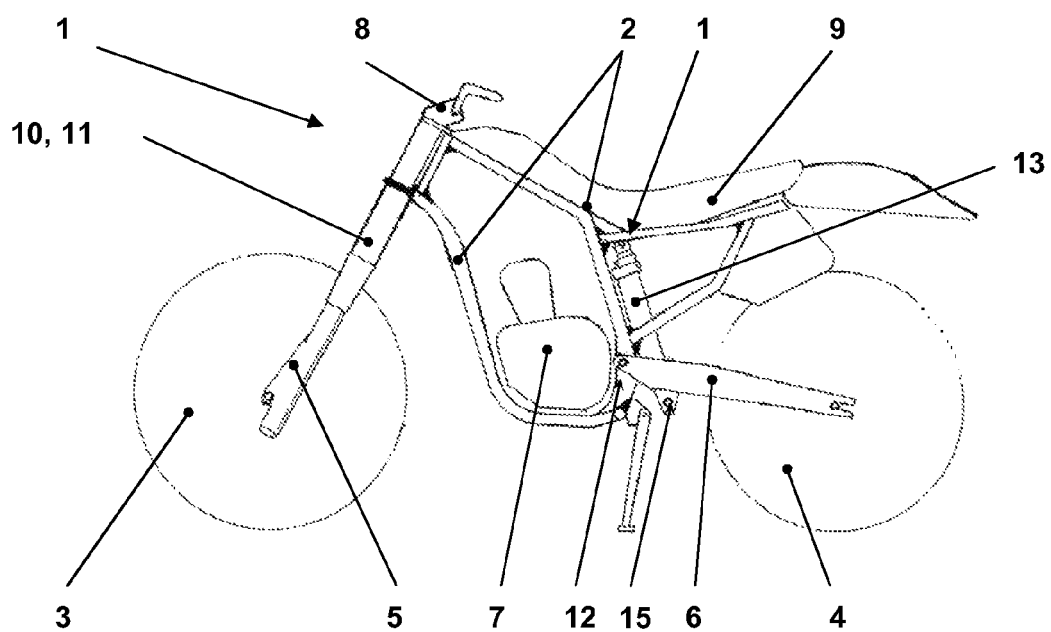
FIG. 1 shows a motorcycle with a pneumatic spring and damping unit according to the invention

FIG. 1 shows, in the form of a diagrammatic illustration, a motorcycle 1 consisting essentially of the frame 2, of a front wheel 3 and rear wheel 4, of a front wheel fork 5, of a rear rocker 6, of a drive assembly 7, of a handlebar and instrument unit 8 and of a seat 9. The front wheel fork 5 in this case guides and steers the front wheel 3, and the rear wheel rocker 6 guides the rear wheel 4. The "chassis" therefore consists here essentially of the front wheel fork 5 and of the rear rocker 6.

A pneumatic spring and damping unit 10 and 11, which absorbs and damps the shocks of the front wheel, is present as an integral component in the front wheel fork 5 in each case in the right-hand and left-hand fork branch. The rear wheel rocker 6 is articulated pivotably on the frame 2 via the bearing 12 and is sprung and damped with respect to vibration excitations via a rear pneumatic spring and damping unit 13.

The rear pneumatic spring and damping unit 13 is designed as a self-pumping spring and damper unit with automatic ride level control and is articulated at an upper articulation point 14 on the body, that is to say on the frame of the motorcycle, and at the lower articulation point 15 on the chassis or on the rear wheel rocker.

Figure 2:
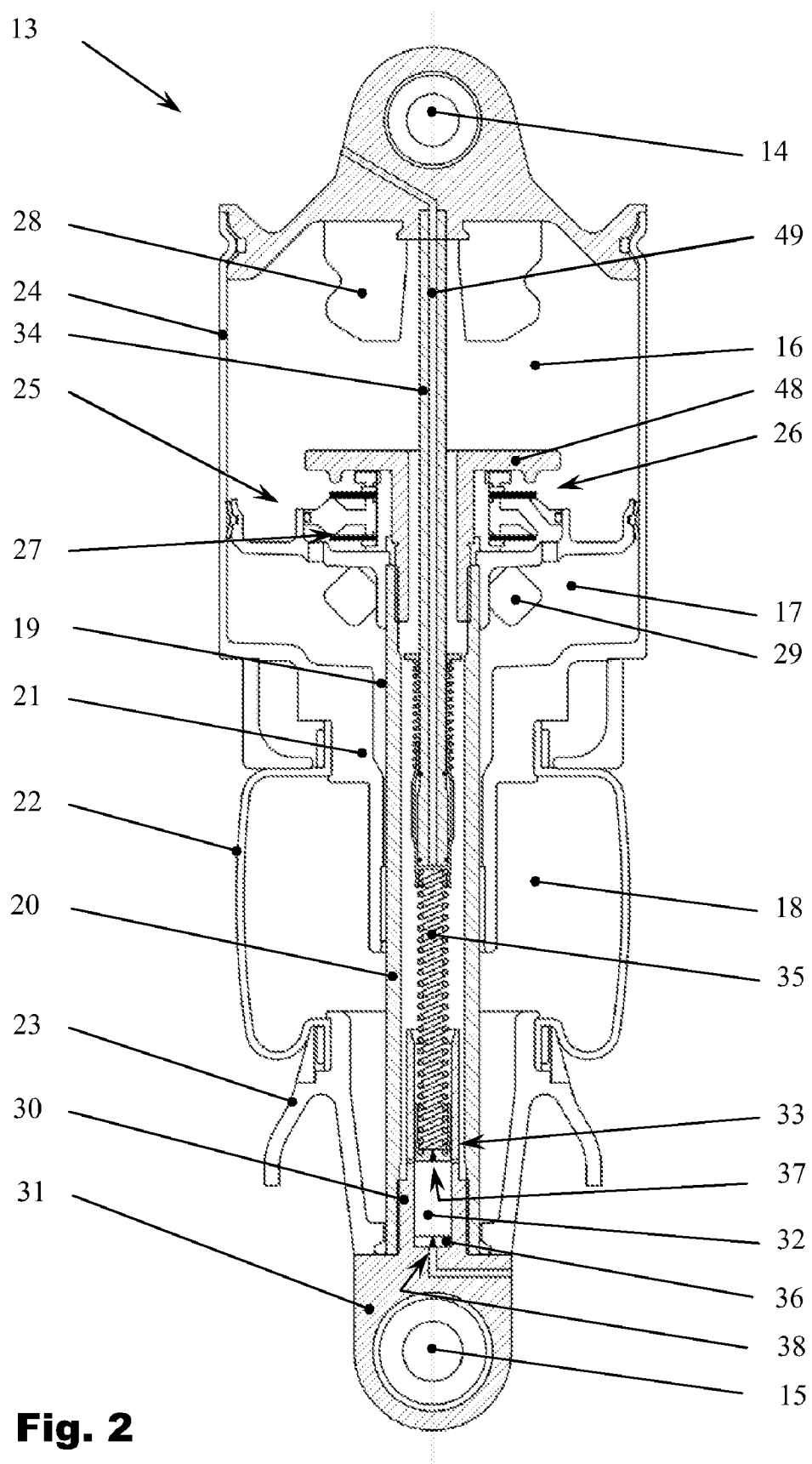
FIG. 2 shows a pneumatic spring and damping unit according to the invention as an individual part in its composition
Figure 3:
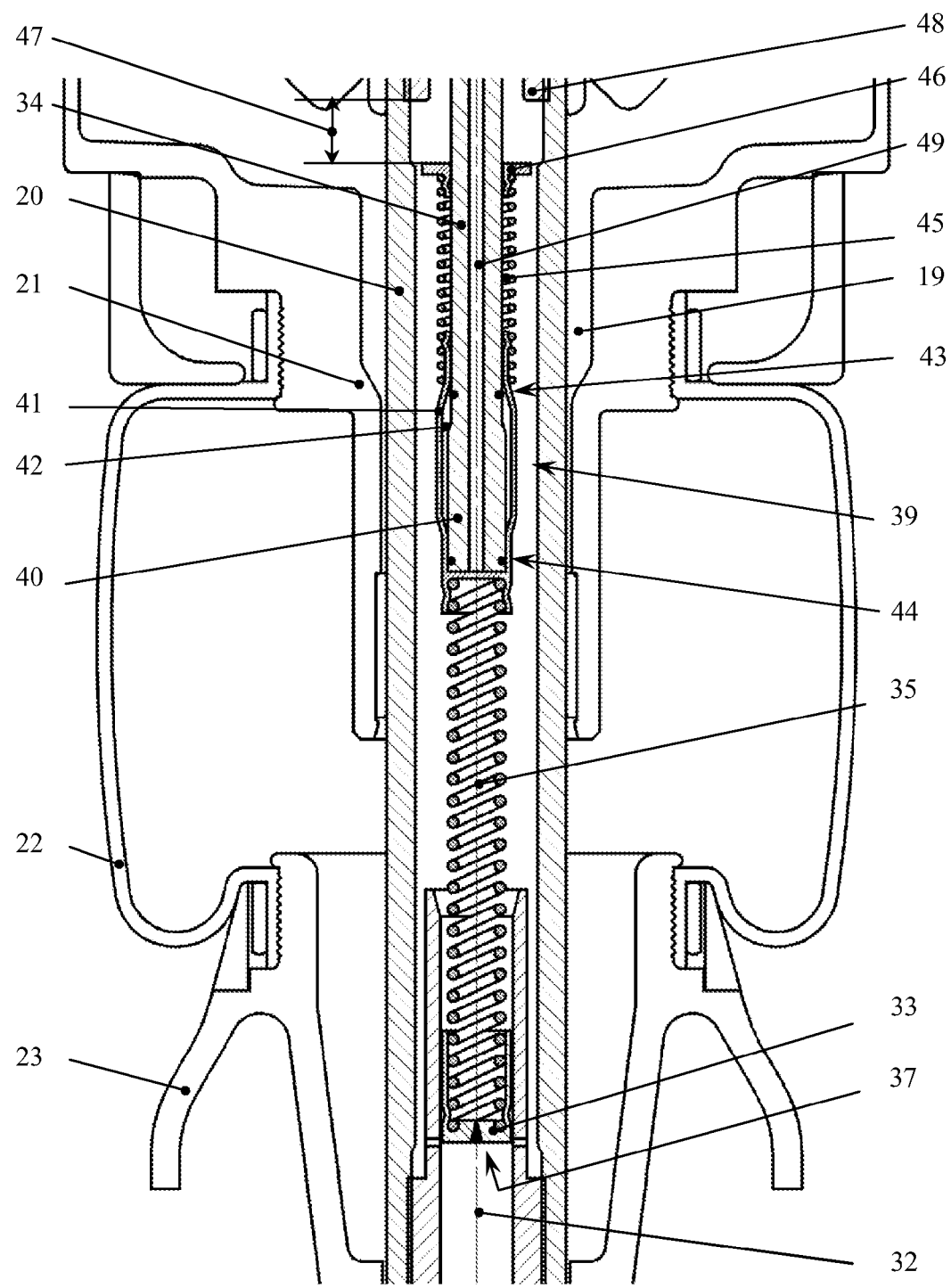
FIG. 3 shows the pneumatic spring and damping unit according to the invention, as shown in FIG. 2, in detail

FIG. 2 shows the pneumatic spring and damping unit 13 as an individual part in its composition, and FIG. 3 shows as an enlarged illustration the middle part of the pneumatic spring and damping unit 13. FIG. 2 and FIG. 3 are to be considered together in the associated following description for the sake of clearer illustration. The pneumatic spring and damper unit 13 has an upper working space 16 filled with compressed air, a middle working space 17 filled with compressed air and an identical lower working space 18, the working spaces 17 and 18 being connected to one another via the annular gap 19 between the hollow piston rod 20 and the piston rod guide 21, said annular gap, if appropriate, also acting as a throttle, depending on the dimensioning.

The lower working space 18 is delimited partially by a movable wall in the form of a rolling bellows 22 which in its lower region rolls on the contours of the rotationally symmetrical rolling body 23 during the jounce of the vehicle.

The upper working spaces 17 and 18 are separated by a damper piston 25 displaceable in a damper cylinder 24, the damper cylinder 24 being connected to the upper articulation point 14, and the damper piston 25 being tied to the lower articulation point 15 by the hollow piston rod 20.

In the damper piston 25, two throughflow throttle valves 26 and 27 are arranged, and this means the working spaces 16 and 17 can be connected when, during the jounce and rebound of the vehicle, the pressure on the respective high-pressure side rises such that the air, as damping and springing medium, is exchanged, damped by the throttle valves, between the working spaces 16 and 17. The throttle valves are designed here as spring washer valves which lie under relatively high prestress on their valve seats, not illustrated in any more detail here. During throughflow, the desired damping work then arises due to dissipation.

The pneumatic spring and damper unit 13 has, furthermore, the stop buffer 28 for the pressure stage and 29 for the tension stage which once again cushion the stop in the end positions, that is to say are used when the pneumatic spring and damper unit 13 comes "to block" due to overload.

Within the hollow piston rod 20, then, the piston pump is designed such that the hollow piston rod 20, received in a sleeve-shaped prolongation 30 of the lower lug 31 and therefore reinforced at its lower end, serves as a pumping cylinder 32 in which a pumping piston 33 designed concentrically with respect to the piston rod 20 is arranged. The pumping piston 33 is driven via a tappet 34 connected to the damper cylinder 24, but is tied elastically to the latter by means of a helical spring 35 arranged concentrically in the hollow piston rod 20 between the tappet 34 and pumping piston 33.

The pressure rise in the compression space, that is to say in the pumping cylinder 32, therefore takes place during the jounce, that is to say in the pressure stage of the spring and damper unit when the distance between the articulation points 14 and 15 is reduced. The reduction in the compression space may be continued until the entire pumping piston travel is utilized. For this purpose, the piston pump consisting essentially of the pumping cylinder 32 and pumping piston 33 is provided with a stop 36, formed by the pumping cylinder and in the bottom of the latter, for limiting the pumping piston travel/compression stroke. In this case, according to the invention, by means of the helical spring 35 as an elastic connection element between the tappet 34 and pumping piston 33, the distance between the pump parts, to be precise the pumping piston and the pumping cylinder, which varies during the jounce of the vehicle, is at least partially compensated elastically. Particularly after the pumping piston 33 has moved up to the stop 36, the residual jounce travel possibly remaining is compensated by the compression of the spring 35, while the force on the pumping piston 33 is maintained according to the spring constant of the spring 35.

The compressed gas volume present when the stop is reached is then under such a high pressure that an opening of the throttle nonreturn valve 37 arranged in the pumping piston 33 takes place, with the result that a connection of the compressed volume in the pumping cylinder 32 is switched to the working space 16. The gas which is under high pressure thereby flows through the helical spring 35 and the annular gaps in the piston rod 20 out of the pumping cylinder 32 into the working space 16, and the body or the motor cycle frame is raised somewhat with each pump stroke, to be precise until the let-down device comes into action, as described further below.

In summary, therefore, the pumping function takes place in that the pumping piston operates in the piston rod of the pneumatic spring damper and is moved via a compression spring and a tappet rod. During jounce, the compression space is reduced and the air in it is compressed. When the pressure of the compressed air is higher than the internal pressure of the pneumatic spring, the valve integrated in the pumping piston opens and the compressed volume is pressed into the pneumatic spring. When the pumping piston has ended its stroke completely and stops against the foot, the compression spring begins to absorb the further spring excursion of the pneumatic spring. Depending on the design of the spring, a slackening of the spring may be set even already before the pumping piston comes to a stop.

During subsequent rebound, that is to say when the distance between the articulation points 14 and 15 increases again, the helical spring 35 (compression spring) is first relaxed. Thereafter, during the extension of the pumping piston 33, the volume in the compression space, that is to say in the pumping cylinder 32, and the residual air located in it are expanded again.

When, during expansion, the pressure in the pumping cylinder 32 falls below the outside air pressure, the intake valve 38, likewise designed as a throttle nonreturn valve, opens to the compression space, with the result that air flows from outside into the compression space. The sequence is repeated during the next jouncing action.

The spring and damper unit has a let-down device 39 which is likewise driven and/or controlled by the distance between the articulation points 14 and 15 which varies as a result of the jounce and rebound of the vehicle. The let-down device 39 is in this case designed as a let-down valve and consists essentially of a let-down piston 40 which is displaceable in a let-down cylinder 41. In this case, the let-down piston 40 and let-down cylinder 41 are designed such that a let-down volume 42 as an annular volume/annular space between the let-down piston and let-down cylinder is obtained.

The let-down piston 40 is in this case advantageously formed by the here thickened end of the tappet 34. The let-down cylinder 41 surrounds the tappet 34 in its lower region as a sleeve within the piston rod 20 and is partially widened in the region of the let-down piston 40. A simple and space-saving design of the let-down device is thereby possible.

The let-down piston 40 has both on the inlet side, that is to say in its upper region, and on the outlet side, that is to say in its lower region, in each case a sealing ring 43 and 44 for sealing off the let-down volume 42 (annular space/annular volume) between the let-down piston 40 and let-down cylinder 41. In this case, the let-down cylinder 41 serves as a sealing seat for the let-down piston 40 or for its sealing rings 43 and 44.

The let-down cylinder 41, designed as a sleeve, is received in a helical spring 45 which has in turn at its upper end a concentric stop plate 46 surrounding the tappet 34 or tappet rod. The stop plate 46 supports the let-down cylinder 41 after a rebound travel 47 on the stop disc 48 connected to the piston or piston rod. The let-down cylinder 41 designed as a sleeve therefore has an elastic stop which supports the let-down cylinder 41 against further displacement after a stop.

In the rest position shown in FIGS. 2 and 3, the same pressure prevails in the let-down volume 42 (annular space/annular volume) as in the working space 16. This pressure equalization takes place via the annular gap between the let-down piston 40 and let-down cylinder 41, said annular gap forming the inlet on the high-pressure side into the let-down volume 42, and by the inner space of the hollow piston rod 20.

During rebound, then, first the tappet 34 and consequently the let-down piston 40 and the let-down cylinder 41 move upward, until, after a first rebound travel 47 coordinated with the design of the vehicle, the stop plate 46 comes to bear against the stop disc 48, thus supports the let-down cylinder 41 elastically and prevents the latter from further upward movement.

During further rebound, that is to say during a further increase in the distance between the articulation points 14 and 15, the helical spring 45 (let-down spring) is compressed. As soon as the spring prestress force rising as a result becomes higher than the force of the let-down piston 40 with respect to the let-down cylinder 41, calculated here by the ratio of the area of the let-down piston multiplied by the acting differential pressure (pneumatic spring internal pressure/outside air pressure), the let-down piston 40 moves upward in relation to the let-down cylinder 41. As a result of this relative displacement of the let-down piston 40 with respect to the let-down cylinder 41, first the inlet-side orifice of the let-down volume 42 to the working space 16 is closed, in that the upper sealing ring 43 is pushed into its sealing seat by means of the let-down piston 40.

During further upward displacement, the lower sealing ring 44 is pushed by the let-down piston 40 out of its sealing seat into the partially widened region of the let-down cylinder 41. Consequently, the connection from the let-down volume 42 to a let-down duct 49 arranged concentrically in the tappet 34 and connected to the outside air pressure is opened. Outward pressure equalization consequently takes place—the let-down operation.

The thickened let-down piston 40 subsequently stops with its upper part against the let-down cylinder 41, and, during further rebound, the helical spring 45 (let-down spring) is then also further prestressed here and absorbs the further spring excursion of the spring and damper unit elastically. Consequently, here, according to the invention the remaining "rebound travel", that is to say the remaining (increasing) distance between the pump parts, to be precise, here, the let-down piston 40 and the let-down cylinder 41, which varies during the rebound of the vehicle is therefore partially compensated elastically, while the force on the let-down cylinder 41 is maintained according to the spring constant of the helical spring 45.

In the following further jounce, first, the helical spring 45 (let-down spring) is relaxed. Then, or at the same time, the let-down cylinder 41 is again pressed downward in relation to the let-down piston 40. The lower sealing ring 44 is then first closed. Subsequently, the upper sealing ring 43 opens again, and pressure equalization between the working space 16 and the let-down volume 42 occurs again. Everything is then ready for the next let-down cycle or pumping cycle.

The structurally predetermined lengths of the piston stroke of the pumping piston 33 and of the control stroke/piston stroke of the let-down piston 40 are, in cooperation with the dimensions of the remaining components, critical for the start and end of automatic pumping and let-down, that is to say, in this sense, for the (control) times. Consequently, the start and end of automatic pumping and let-down can be set and/or also made settable from outside in the simplest possible way by fixing the geometry or the lengths of the individual parts.

In the event of constant vehicle movements/body movements, it may happen, if the amplitudes are correspondingly high, that, during each cycle, pumping and let-down take place once in each case. If relatively more volume is let down than is pumped, the level falls correspondingly until only pumping still occurs per cycle. The level then rises again until the let-down function acts again to an increased extent. This results in a statistical middle position according to the design of the lengths of the individual parts, in cooperation with vehicle springing, weight and load, precisely in automatic ride level control. By means of such a design according to the invention of the spring and damper unit, a desired "height position" of the body can be set in a simple way independently of the load.

Figure 4:
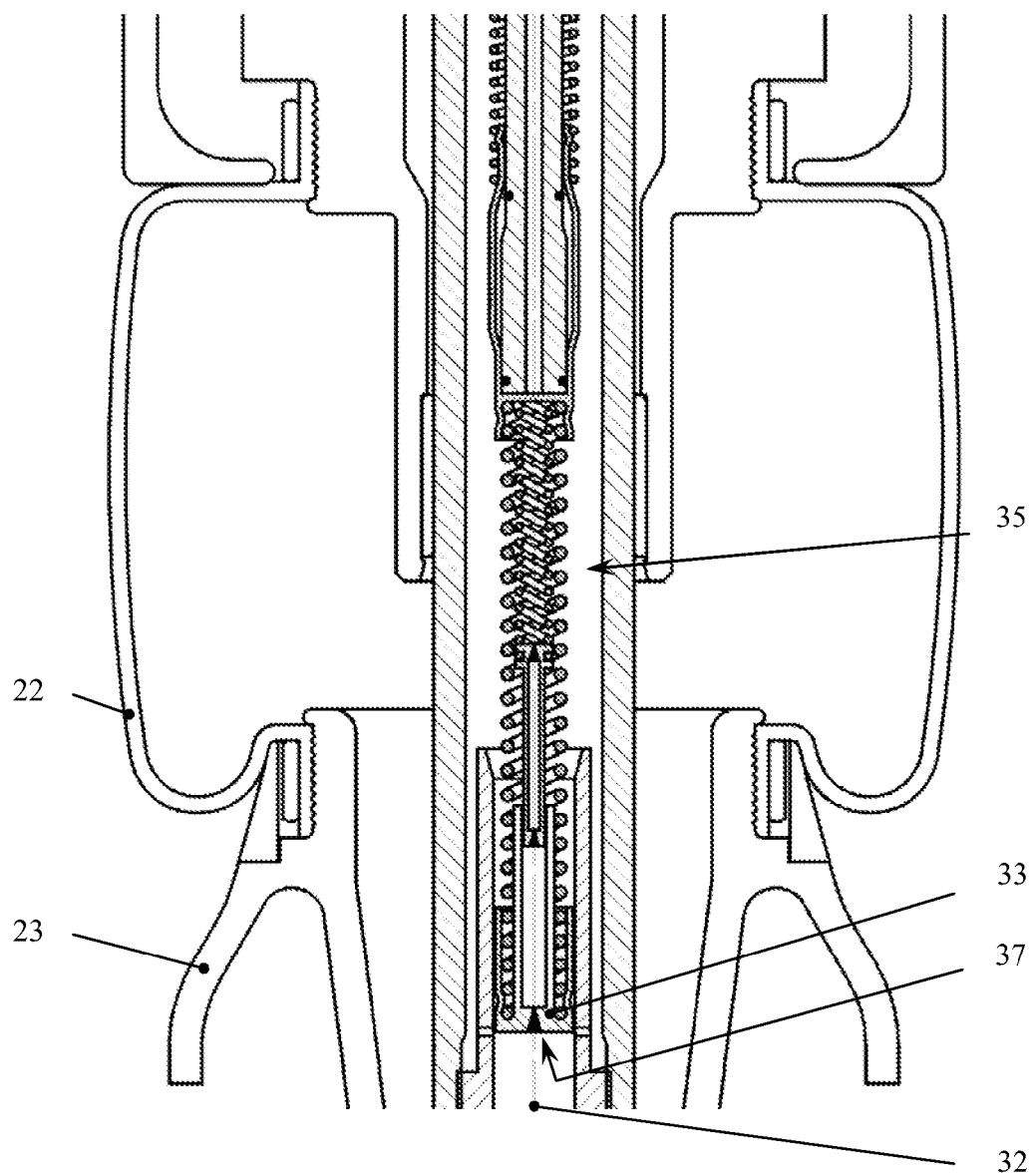
FIG. 4 shows a pneumatic spring and damping unit according to the invention with a two-stage pump
Figure 5:
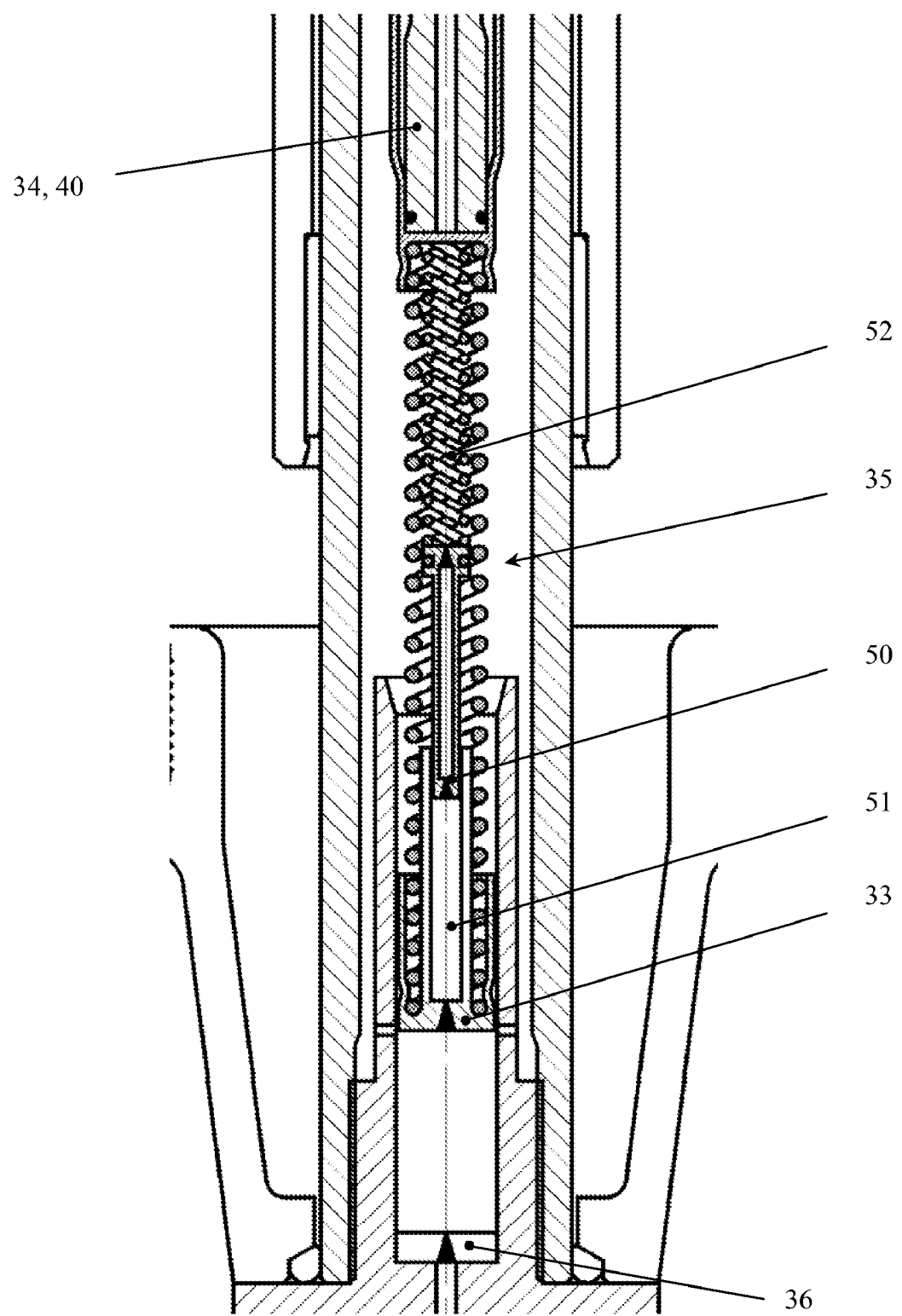
FIG. 5 shows the pneumatic spring and damping unit according to the invention, as shown in FIG. 5, in detailed form

FIG. 4 and FIG. 5 show together a further design of the spring and damper unit with a two-stage pump which is likewise driven by the distance between the articulation points which varies as a result of the jounce and rebound of the vehicle, said pump generating a pressure rise in the damping and/or springing medium.

The two-stage pump is in this case designed such that the second pump stage, consisting essentially of the pumping piston 50, pumping cylinder 51 and helical spring 52, is driven only when the compression stroke of the first stage of the pump is already fully utilized. This second stage functions on the same principle as the first stage consisting of the pumping cylinder 32 and pumping piston 33, but operates only when the helical spring 35 (compression spring) of the first stage lies, partially compressed, against the stop 36.

This may occur, for example, when, in the case of a high load or leakage losses, the level of the body has dropped after a lengthy standstill time to an extent such that the pumping piston 33 is already pressed into block. The result of this is that no intake operation by the first pump stage can take place and the spring and damper unit is not in its regulating position from which ride level control can start over the first meters traveled. For this operating state, the second pump stage is installed, which serves as it were as a "starting aid" in the case of an extremely low level and in any event ensures that the desired level can be reached.

For the structural implementation of the spring and damper unit shown here, with a second pumping stage, then, the pumping piston of the first stage is designed as a hollow cylinder and consequently in its inner part at the same time as a concentrically arranged pumping cylinder 51. Within the hollow pumping piston 33, then, the concentrically designed pumping piston 50 of the second stage is arranged. The pumping piston 50 is likewise driven by the tappet 34, but is tied elastically to the tappet 34 by means of a helical spring 52 arranged in the concentric helical spring 35 between the tappet 34 and pumping piston 50. The pumping piston 50, too, is provided with a throttle nonreturn valve, not illustrated in any more detail here, which serves as an intake valve. The two pump stages are consequently connected in series in a space-saving way and are arranged concentrically within the hollow piston rod.

When the first stage is operating, the pumped air merely flows through the second stage.

Figure 6:
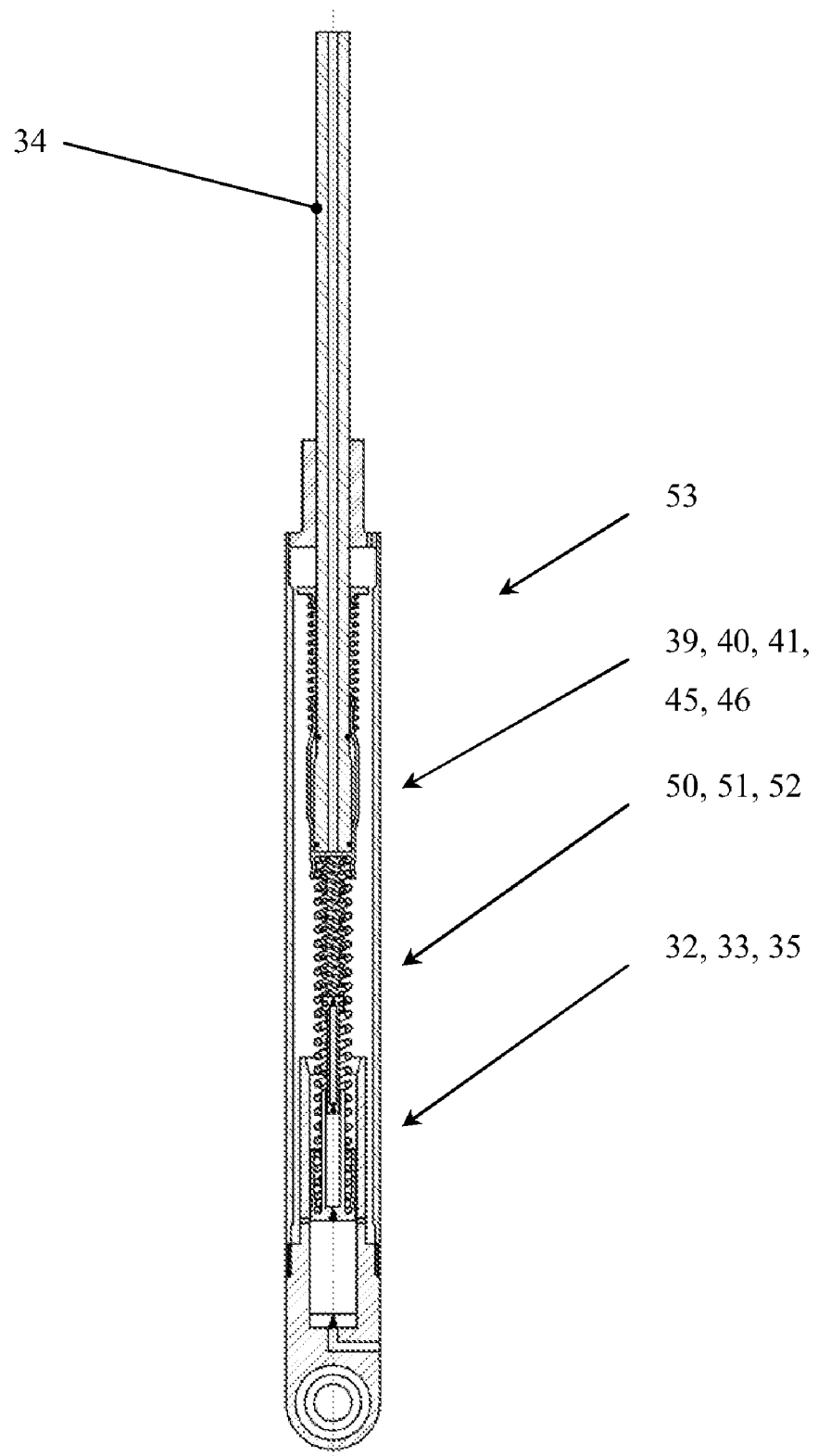
FIG. 6 shows the version according to the invention of a two-stage pump articulated between two articulation points on the body and chassis of a vehicle.

FIG. 6 shows the design according to the invention of a two-stage pump, articulated between two articulation points on the body and chassis of a vehicle, of a self-pumping spring and damper unit, such as was illustrated in more detail in the preceding exemplary embodiments, as a two-stage chassis pump 53 to be used for automatic pressure generation, driven by the jounce and rebound of the vehicle, within any desired pressure supply system for ride level control.

This therefore involves only the inner part of the above-described design, which consists essentially of the tappet 34 together with the pumping cylinder 32 and pumping piston 33, of the helical spring 35 for the first pumping stage, of the pumping piston 50 and pumping cylinder 51, and the helical spring 52 of the second pumping stage and of the let-down device 39 together with the let-down piston 40, let-down cylinder 41, helical spring 45, stop plate 46, stop disc 48 and the respectively associated valves. This version is configured as a straightforward chassis pump, needs no electronics and can serve as an air supply unit for any desired vehicle having pneumatic spring suspension.

LIST OF REFERENCE SYMBOLS (Part of the Description)
1 Motorcycle
2 Frame
3 Front wheel
4 Rear wheel
5 Front wheel fork
6 Rear rocker
7 Drive assembly
8 Instrument unit
9 Seat
10 Pneumatic spring and damping unit
11 Pneumatic spring and damping unit
12 Bearing
13 Pneumatic spring and damping unit
14 Articulation point
15 Articulation point
16 Working space
17 Working space
18 Working space
19 Annular gap
20 Piston rod
21 Piston rod guide
22 Rolling bellows
23 Rolling body
24 Damper cylinder
25 Damper piston
26 Throttle valve
27 Throttle valve
28 Stop buffer
29 Stop buffer
30 Sleeve-shaped prolongation
31 Lower lug
32 Pumping cylinder
33 Pumping piston
34 Tappet
35 Helical spring
36 Stop
37 Throttle nonreturn valve
38 Intake valve
39 Let-down device
40 Let-down piston
41 Let-down cylinder
42 Let-down volume
43 Sealing ring
44 Sealing ring
45 Helical spring
46 Stop plate
47 Rebound travel
48 Stop disc
49 Let-down duct
50 Pumping piston
51 Pumping cylinder
52 Helical spring
53 Two-stage chassis pump

The invention claimed is:

1. A self-pumping spring and damper unit with automatic ride level control for chassis of a vehicle, with two articulation joints, one of the two articulation joints being arranged on a sprung vehicle part and at the other one of the two articulation joints being arranged on an unsprung vehicle part, the unit comprising:
at least two working spaces configured to be connected through at least one throttle valve and containing a damping or springing medium which, during jounce and rebound of the vehicle, is exchanged between the working spaces through the at least one throttle valve, and
at least one pump driven by a changing distance between the articulation joints, the distance varying as a result of the jounce and rebound of the vehicle, the pump generating a pressure rise in the damping medium to cause the spring and damper unit to maintain a substantially fixed level in the event of a variable vehicle load, the pump having two pump parts which are movable in relation to one another, one of the two pump parts being connected to one of the two articulation joints and the other one of the two pump parts being connected to the other one of the two articulation joints such that the distance between the articulation joints is transferred as a compression stroke to the distance between the two pump parts,
wherein an elastic connection element is arranged between at least one of the two pump parts and the one of the two articulation joints associated with the pump part such that the elastic connection at least partially elastically compensates for a change in the distance between the two pump parts during the jounce and rebound of the vehicle,
wherein the pump is configured as a piston pump with a pumping piston connected to either one of the two articulation joints and movable in a pumping cylinder connected to the other one of the two articulation joints, so that a rise in pressure takes place while the spring and damper unit is in a pressure stage,
wherein the pumping piston and pumping cylinder form a compression space configured to be connected to outside air or to a pressure accumulator via a throttle nonreturn valve opening toward the compression space.

2. The self-pumping spring and damper unit as claimed in claim 1, wherein the distance between the two pump parts is adjustable.

3. The self-pumping spring and damper unit as claimed in claim 1, wherein two of the at least two working spaces are separated by a damper piston displaceable in a damper cylinder, the damper cylinder being connected to one of the two articulation joints and the damper piston being connected via a hollow piston rod to the other one of the two articulation joints, and the pump being arranged within the hollow piston rod such that the hollow piston rod serves as a pumping cylinder in which a pumping piston is arranged, the pumping piston being driven via a tappet connected to the damper cylinder.

4. The self-pumping spring and damper unit as claimed in claim 3, wherein the elastic connection element is configured as a helical spring arranged concentrically in the hollow piston rod between the tappet and the damper piston.

5. The self-pumping spring and damper unit as claimed in claim 3, wherein the pumping piston has a throttle nonreturn valve opening to one of the at least two working spaces.

6. The self-pumping spring and damper unit as claimed in claim 3, wherein the pump has a stop for limiting the pumping piston travel.

7. The self-pumping spring and damper unit as claimed in claim 3, wherein the spring and damper unit has at least one let-down device controlled by the distance between the articulation joints, the let-down device generating a pressure lowering in the damping medium, with the result that the spring and damper unit maintains a fixed level during a variable load on the vehicle.

8. The self-pumping spring and damper unit as claimed in claim 7, wherein the let-down device is a let-down valve with a let-down piston displaceable in a let-down cylinder, such that a let-down volume as an annular volume between the let-down piston and let-down cylinder is obtained.

9. The self-pumping spring and damper unit as claimed in claim 8, wherein the let-down piston has two ends with at least one sealing ring near each of the two ends for sealing of the annular volume between the let-down piston and let-down cylinder, and the let-down cylinder serves as a sealing seat for the let-down piston, the let-down device being designed with an inlet side connectable to one of the working spaces and an outlet side connectable to outside air or to a pressure accumulator in response to a relative displacement between the let-down piston and let-down cylinder.

10. The self-pumping spring and damper unit as claimed in claim 8, wherein the let-down piston is formed by a tappet rod and the let-down cylinder surrounds the tappet rod as a sleeve.

11. The self-pumping spring and damper unit as claimed in claim 8, wherein the let-down cylinder is configured as a sleeve and has an elastic stop which supports the let-down cylinder with respect to a displacement of the let-down piston on the piston rod.

12. The self-pumping spring and damper unit as claimed in claim 11, wherein the elastic stop is designed as a concentric stop plate which surrounds the tappet rod and which is supported by a helical spring on the let-down cylinder.

13. The self-pumping spring and damper unit as claimed in claim 3, wherein the pump is a two-stage pump with a first pump stage and a second pump stage, the two-stage pump being driven by the changing distance between the articulation joints, the pump generating a pressure rise in the damping medium, the two-stage pump being configured to have a second pump stage that is driven only when the compression stroke of the first stage of the pump is already fully utilized.

14. The self-pumping spring and damper unit as claimed in claim 13, wherein the first pump stage and the second pump stage are connected in series and are arranged concentrically within a hollow piston rod.

15. The self-pumping spring and damper unit as claimed in claim 14, wherein the hollow pumping piston of the first pump stage serves as a pumping cylinder in which a pumping piston of the second pump stage is arranged concentrically with respect to the piston rod.

* * * * *